US008531646B2

(12) United States Patent
Shi et al.

(10) Patent No.: US 8,531,646 B2
(45) Date of Patent: Sep. 10, 2013

(54) TUNABLE LIQUID CRYSTAL DEVICES, DEVICES USING SAME, AND METHODS OF MAKING AND USING SAME

(75) Inventors: Lei Shi, Kent, OH (US); Philip J. Bos, Hudson, OH (US); Paul F. Manamon, Dayton, OH (US)

(73) Assignee: Kent State University, Kent, OH (US)

( * ) Notice: Subject to any disclaimer, the term of this patent is extended or adjusted under 35 U.S.C. 154(b) by 402 days.

(21) Appl. No.: 12/208,727

(22) Filed: Sep. 11, 2008

(65) Prior Publication Data

US 2009/0073331 A1 Mar. 19, 2009

Related U.S. Application Data

(60) Provisional application No. 60/971,312, filed on Sep. 11, 2007.

(51) Int. Cl.
*G02F 1/13* (2006.01)
*G02F 1/153* (2006.01)
*G02F 1/01* (2006.01)

(52) U.S. Cl.
USPC .................................... 349/202; 359/272

(58) Field of Classification Search
USPC .................... 349/201, 202; 359/272
See application file for complete search history.

(56) References Cited

U.S. PATENT DOCUMENTS

| 5,754,342 A * | 5/1998 | Ohnishi et al. ............... 359/569 |
| 6,456,419 B1 * | 9/2002 | Winker et al. ................ 359/279 |
| 6,577,786 B1 * | 6/2003 | Cappiello et al. ............... 385/24 |
| 7,835,052 B2 * | 11/2010 | Minabe et al. .................. 359/29 |

| 2006/0164593 A1 * | 7/2006 | Peyghambarian et al. ... 349/200 |
| 2006/0209250 A1 * | 9/2006 | Holmes ......................... 349/202 |
| 2006/0221287 A1 * | 10/2006 | Roh .............................. 349/139 |

FOREIGN PATENT DOCUMENTS

WO WO 2006/092758 A2 * 9/2006

OTHER PUBLICATIONS

"Continuous beam shaping with optical phased arrays using diffractive optics optimization," by Enguehard et al, Aerospace Conference Proceedings, vol. 3, pp. 1417-1422, 2002.*
"Pancharatnam-Berry phase optical elements for wave front shaping in the visible domain: Switchable helical mode generation" by Marrucci et al, Applied Physical Letters, vol. 88, pp. 221102-1 through 221102-3, 2006.*
"Liquid-crystal diffraction gratings using polarization holography alignment techniques," by Crawford et al, Journal of Applied Physics, vol. 98, 123102, 2005.*
Escuti et al., "Polarization-Independent Switching with High Contrast from a Liquid Crystal Polarization Grating," SID Symposium Digent, vol. 37, pp. 1443-1446, (2006).
Crawford et al., "Liquid-crystal diffraction gratings using polarization holography alignment techniques," J. Appl. Phys., 98, (2005).

(Continued)

*Primary Examiner* — Kaveh Cyrus Kianni
*Assistant Examiner* — Robert Tavlykaev
(74) *Attorney, Agent, or Firm* — Fay Sharpe LLP

(57) ABSTRACT

An electro-optical device comprises a liquid crystal material disposed in a cell and electrodes configured to bias the liquid crystal material into a generally in-plane director configuration having a non-constant spatial pattern selectable or adjustable by an in-plane component of the biasing to produce a desired refractive of diffractive optical effect.

23 Claims, 9 Drawing Sheets

(56) References Cited

OTHER PUBLICATIONS

Honma et al., "Liquid-crystal Fresnel Zone Plate Fabricated by Microrubbing," Japanese Journal of Applied Physics, vol. 44, No. 1A, pp. 287-290, (2005).

McManamon et al., "Applications look at the use of liquid crystal writable gratings for steering passive radiation," Optical Engineering, vol. 32, No. 11, pp. 2657-2664, (1993).

Duncan et al., "Wide-angle achromatic prism beam steering for infrared countermeasure applications," Optical Engineering, vol. 42, No. 4, pp. 1038-1047, (2003).

Resler et al., "High-efficiency liquid-crystal optical phased-array beam steering," Optics Letters, vol. 21, No. 9, pp. 689-691, (1996).

S. Pancharatnam, "Achromatic Combinations of Birefringent Plates," The Proceedings of the Indian Academy of Sciences, vol. XLI, No. 4, Sec. A, pp. 137-144, (1955).

\* cited by examiner (a) Top View – Middle of the LC cell (x-y plane) → x (b) Side View – x-z plane → x

Top (x-y plane) view

Side (x-z plane) view

Electrodes on substrate (14) = 10 / 12 / 12 / 12 / 10 / 10 / 10 / 12 volts
Electrodes on substrate (15) = 0 / 2 / 2 / 2 / 0 / 0 / 0 / 2 volts
Period = 15.5 microns Top (x-y plane) view Side (x-z plane) view Electrodes on substrate (14) = 10 / 12 / 12 / 12 / 12 / 10 / 12 / 12 volts
Electrodes on substrate (15) = 0 / 2 / 2 / 2 / 2 / 0 / 2 / 2 volts
Period = 13.5 microns Top (x-y plane) view Side (x-z plane) view Electrodes on substrate (14) = 10 / 10 / 10 / 10 / 12 / 10 / 12 / 12 volts
Electrodes on substrate (15) = 0 / 0 / 0 / 0 / 2 / 0 / 2 / 2 volts
Period = 7 microns

TUNABLE LIQUID CRYSTAL DEVICES, DEVICES USING SAME, AND METHODS OF MAKING AND USING SAME

This application claims the benefit of U.S. Provisional Application No. 60/971,312 filed Sep. 11, 2007. U.S. Provisional Application No. 60/971,312 filed Sep. 11, 2007 is incorporated herein by reference in its entirety.

The U.S. Government has a paid-up license in this invention and the right in limited circumstances to require the patent owner to license others on reasonable terms as provided for by the terms of contract No. F33615-01-1-1681 awarded by the Air Force Research Laboratory (AFRL).

BACKGROUND

The following relates to the optoelectronic arts. It especially relates to electrically tunable or adjustable liquid crystal devices, methods of making same, methods of tuning or adjusting same, and devices or apparatuses using same. However, the following will also find application in conjunction with other apparatuses, articles of manufacture, and methods.

There is substantial interest in non-mechanical devices for tunable or adjustable manipulation of light. For example, tunable beam steering devices that can steer a beam of light along different angles or directions responsive to an electrical control input have numerous applications in optics, optical systems, electrooptical systems, and so forth.

Liquid crystal (LC) diffractive devices, such as switchable LC prisms, LC optical phased arrays (OPA), and so forth, are known. These devices typically generate a linear change of optical path delay (OPD) across the aperture, which tilts the phase front and thereby steers the optical beam. The steering angle is related to the magnitude of phase gradient caused by the spatially varying retardation $\Delta n \cdot d$ where $\Delta n$ is the effective birefringence and $d$ is the LC cell thickness.

Some known LC beam steering concepts are based on switchable LC prisms using the OPA technology. For a given light wavelength, a phase factor of $2\pi$, corresponding to an OPD of one wavelength, can be periodically subtracted from the phase front without influencing the far-field pattern produced by the phase front.

Problematically, in these approaches it is difficult to achieve a large gradient over a large aperture with a continuous phase profile. A large cell thickness is typically used to achieve a large gradient, but the large cell thickness leads to slow response, absorption, light scattering, or other performance degradation.

In some devices, so-called "resets" are incorporated into the phase profile, the resets having an OPD step that is an integer number of wavelengths of the light. In devices it is known that resets substantially degrade the device efficiency. Such optically phased arrays generally do not provide a sufficiently large steering angle with high efficiency for many applications.

Another known approach is based on a quarter-wave/half-wave/quarter-wave (i.e., "QHQ") configuration. In this approach, the retardation is designed to be spatially uniform, but the saw-tooth phase profile is implemented by distributing azimuthal angles of LC director configuration. A typical QHQ stack includes an input polarizer, an input quarter-wave plate, a half-wave plate, an output quarter-wave plate, and an output polarizer, in that order. The incident light is processed by the combination of the input polarizer and input quarter-wave to generate circularly polarized input light $E_{in}$ according to the following Jones matrix-based expression:

$$E_{in} = \begin{bmatrix} Ex_{in} \\ Ey_{in} \end{bmatrix} = \begin{bmatrix} Ex_{in} \\ i \cdot Ex_{in} \end{bmatrix}. \quad (1)$$

In Equation (1), for convenience a right hand circular polarized light convention is used. The symbols $Ex_{in}$ and $Ey_{in}$ represent are vector components along x- and y-axis directions, respectively. The circularly polarized light $E_{in}$ is input to the half-wave plate to generate output light denoted $E_{out}$ represented as follows:

$$E_{out} = R \cdot P \cdot R^{-1} \cdot \begin{bmatrix} Ex_{in} \\ Ey_{in} \end{bmatrix}, \quad (2)$$

where R and P are Jones matrices for a rotation and a half-wave plate, respectively, and $\beta$ denotes the angle between the slow axis of the half-wave plate and the x-axis. Equation (2) can be written as:

$$E_{out} = \begin{bmatrix} \cos(\beta) & -\sin(\beta) \\ \sin(\beta) & \cos(\beta) \end{bmatrix} \cdot \begin{bmatrix} 1 & 0 \\ 0 & e^{i\varphi} \end{bmatrix} \cdot \begin{bmatrix} \cos(\beta) & \sin(\beta) \\ -\sin(\beta) & \cos(\beta) \end{bmatrix} \cdot \begin{bmatrix} Ex_{in} \\ i \cdot Ex_{in} \end{bmatrix}, \quad (3)$$

where $\varphi$ denotes the phase retardation of the half-wave plate, which is $\varphi=\pi$ radians for a half-wave plate. Equation (3) can be written as:

$$E_{out} = \begin{bmatrix} \cos^2(\beta) + e^{i\varphi} \cdot \sin^2(\beta) & \cos(\beta) \cdot \sin(\beta)(1 - e^{i\varphi}) \\ \cos(\beta) \cdot \sin(\beta)(1 - e^{i\varphi}) & \sin^2(\beta) + e^{i\varphi} \cdot \cos^2(\beta) \end{bmatrix} \cdot \begin{bmatrix} Ex_{in} \cdot e^{i \cdot 2\beta} \\ -i \cdot Ex_{in} \cdot e^{i \cdot 2\beta} \end{bmatrix}. \quad (4)$$

From Equation (4) it is seen that the output light $E_{out}$ is left hand circularly polarized light (for input right hand circularly polarized light) with a phase factor $e^{i \cdot 2\beta}$ that depends upon the angle $\beta$ between the slow axis of the half-wave plate and the x-axis. The output quarter-wave plate and output polarizer serve to convert the final output light back into linearly polarized light, e.g. of the form $$\begin{bmatrix} Ex_{out} \cdot e^{i \cdot 2\beta} \\ 0 \end{bmatrix}$$

for output light polarized parallel to the x-axis.

Based on Equation (4), the phase of the transmitted light can be controlled by the azimuthal angle $\beta$ of the slow axis of the half-wave plate. If the half-wave plate is implemented as a liquid crystal cell, then the angle $\beta$ and hence the phase of the output light can be varied spatially across the LC cell. If a LC cell has an in-plane or horizontal director configuration in which the in-plane azimuthal angle of the directors linearly rotate from 0 to $\pi$ across an aperture of the LC cell, and the optical path delay (OPD) everywhere across the cell aperture is $\pi$ radians corresponding to a half-wave retardation (for the designed wavelength), then the final spatial phase profile of transmitted light $E_{out}$ will linearly change from 0 to $2\pi$ due to the phase factor $e^{i \cdot 2\beta}$ in Equation (4), which has the effect of redirecting or bending the light by an amount controlled by the spatial distance over which the 0 to $2\pi$ variation occurs.

LC-based optical elements having the described configuration, that simulate gratings or prisms to redirect or bend light by a selected angle have been fabricated. However, these LC-based optical elements are not continuously tunable or adjustable. Heretofore, LC optical beam-bending or beam-redirecting elements have achieved the spatial variation in in-plane director orientation using static alignment techniques that generate a fixed spatial distribution of the in-plane azimuthal orientation of the LC director across the LC cell. For example, the substrates of the cell can include alignment layers that strongly anchor the LC directors to the desired spatial distribution of azimuthal angles. As a result, the director configuration is fixed when no voltage is applied, and the devices are not tunable. In contrast, in some existing devices an applied voltage can change the steering angle between two or three discrete predetermined angles, but the these devices are not tunable in the sense that the steering angle can be controlled to be one of a large number of angles.

The following contemplates improved assemblies and methods that overcome the above-mentioned limitations and others.

BRIEF SUMMARY

In some embodiments disclosed herein as illustrative examples, a tunable liquid crystal device comprises: a cell including parallel spaced apart substrates defining a cell gap; a liquid crystal material disposed in the cell gap, a director configuration of the liquid crystal material at least near the substrates having a generally vertical orientation further including a spatially varying in-plane component conforming to an in-plane spatial pattern; and electrodes disposed on or in the parallel spaced apart substrates and configured to apply an electrical potential across the cell gap having an adjustable in-plane spatial variation, the applied electrical potential biasing the director configuration of the liquid crystal material toward a generally in-plane orientation generally conforming to the in-plane spatial pattern with at least one dimension adjustable by adjustment of the applied electrical potential.

In some embodiments disclosed herein as illustrative examples, a beam steering method comprises: providing a liquid crystal material disposed in a cell; and biasing the liquid crystal material to obtain a director configuration having a generally in-plane orientation with an in-plane director configuration periodicity selectable or adjustable by an in-plane component of the biasing to effectuate a desired beam steering angle.

In some embodiments disclosed herein as illustrative examples, an electro-optical device comprises: a liquid crystal material disposed in a cell; and electrodes configured to bias the liquid crystal material into a generally in-plane director configuration having a non-constant spatial pattern selectable or adjustable by an in-plane component of the biasing to produce a desired refractive of diffractive optical effect.

BRIEF DESCRIPTION OF THE DRAWINGS

The drawings are only for purposes of illustrating preferred embodiments and are not to be construed as limiting.

DETAILED DESCRIPTION OF PREFERRED EMBODIMENTS

Figure 1:
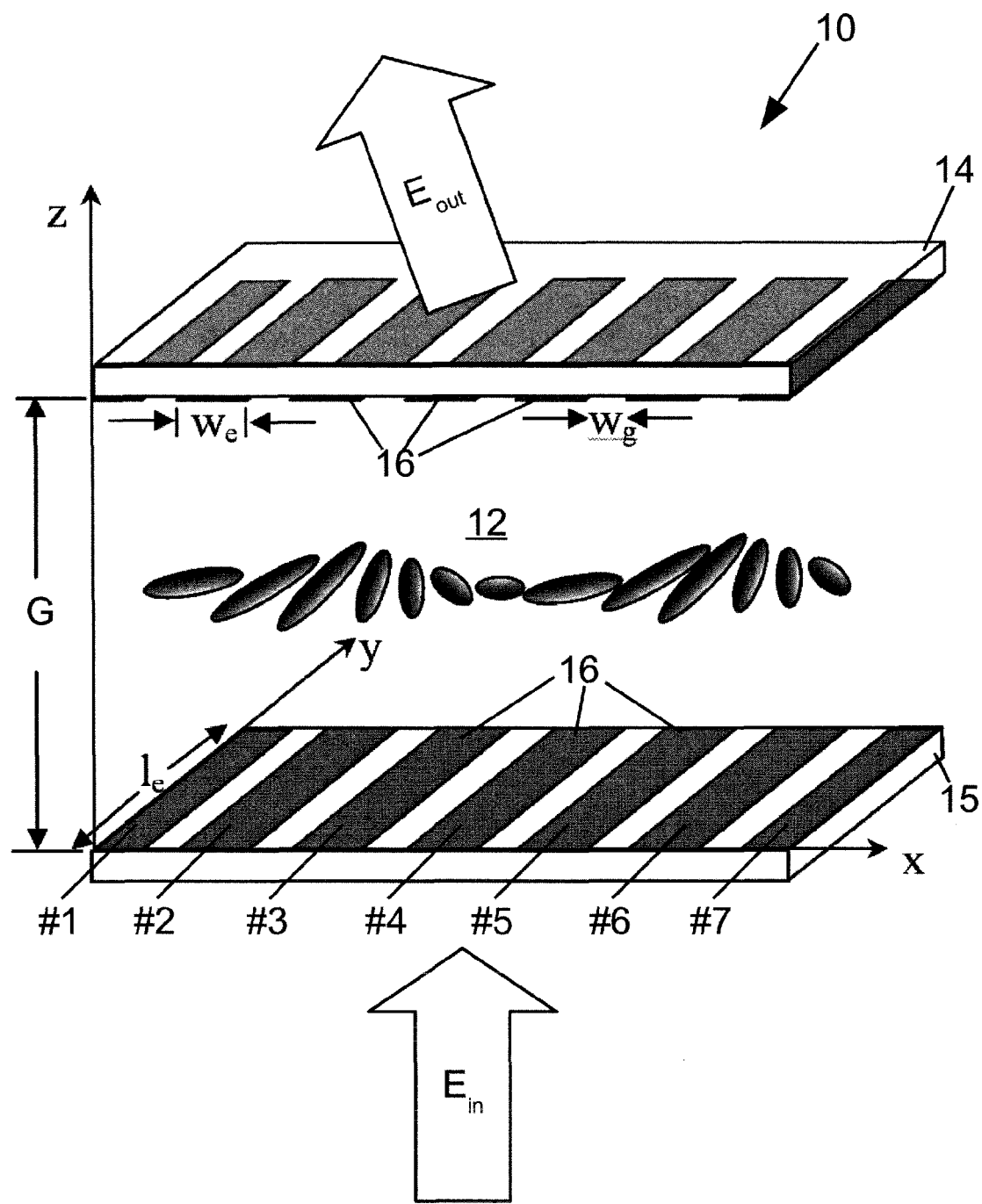
FIG. 1 diagrammatically shows an electro-optical device in its operational state.

With reference to FIG. 1, an electro-optical device 10 includes a liquid crystal material 12 disposed in and substantially filling a cell gap G between parallel substrates 14, 15 of a liquid crystal cell. The direction of spacing of the cell gap G, labeled as the z-axis in the FIGURES, is also referred to as the vertical direction herein. The orthogonal x-y plane is also referred to as "in-plane" herein. It will be appreciated that the vertical direction denotes the direction of light passing through the cell gap G, and does not imply any particular orientation of the cell gap G, or of the cell, respective to any gravitational field or other outside reference.

The substrates 14, 15 includes a plurality of spaced-apart electrodes 16 arranged as pairs on the opposing substrates 14, 15. The illustrated device 10 includes seven illustrated pairs of electrodes along an x-direction; however, more or fewer electrode pairs can be included. The illustrated electrodes 16 all have the same width $W_c$ and are spaced apart by constant gaps $W_g$; however, the electrodes can have different widths and/or different spacings. Still further, in some embodiments the electrodes are not arranged as pairs (e.g., there may be more electrodes on one substrate than the other, or they may not be arranged as opposing pairs across the cell gap G).

Figure 2:
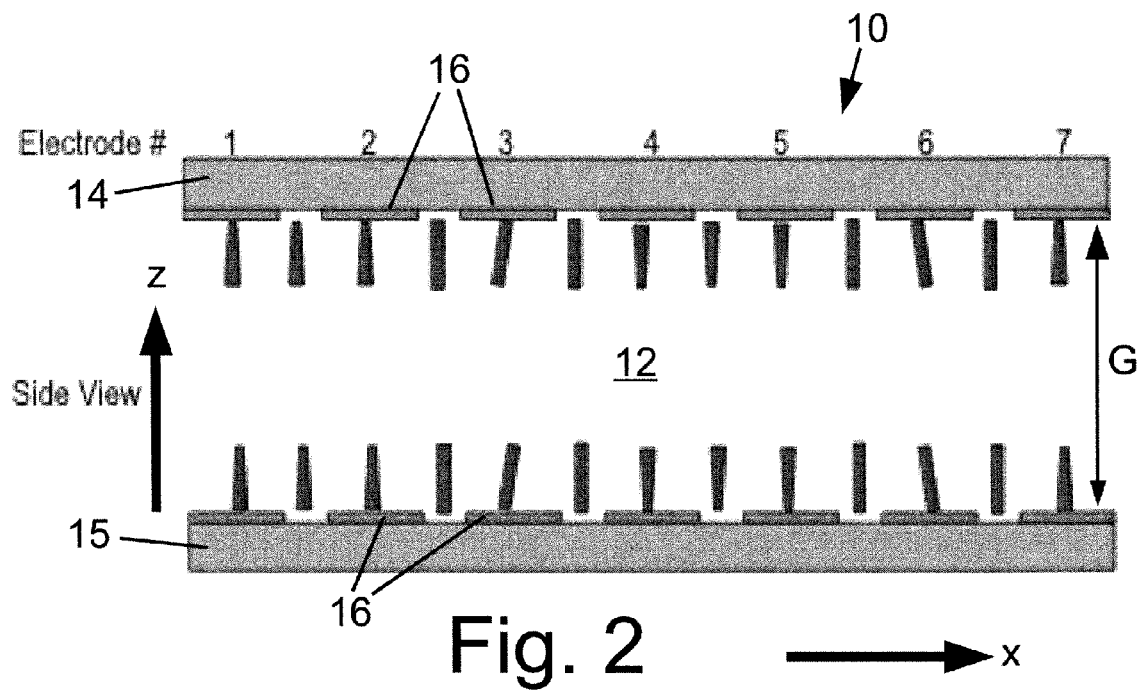
FIGS. 2 and 3 diagrammatically show side and top views of the electro-optical device of FIG. 1 in its non-operational state.

With reference to FIG. 2, the illustrated liquid crystal material 12 is has a negative dielectric anisotropy, meaning that the directors of the liquid crystal material tend to align transverse to the direction of an applied electrical field. FIG. 2 shows the zero-bias configuration, in which alignment layers or surfaces on the respective substrates 14, 15 proximate to the liquid crystal material 12 are configured by rubbing, photoalignment, evaporated anisotropy, or so forth to bias the directors of the liquid crystal molecules to align substantially in the vertical direction, that is transverse to the surfaces of the substrates 14, 15. FIG. 1, on the other hand, shows an in-plane director configuration for the liquid crystal material 12 achieved by applying a bias to the electrodes 16.

The director configuration is in-plane under bias for the negative dielectric anisotropy material 12, when the electrical field of the bias is directed in the vertical direction, i.e. transverse to the substrates 14, 15. However, such a vertical electrical field does not, by itself, induce any particular in-plane spatial pattern to the director configuration. Indeed, a purely vertical electrical field, by itself, would drive the directors in-plane but would impart no pattern whatsoever to the in-plane directors, which would have a substantially randomized in-plane component. To achieve a beam-bending effect, it is desired for the director configuration to have an in-plane spatial pattern that is periodic along the direction of light bending, e.g. along the x-direction in the illustrative examples. This is shown in FIG. 1, where a "spiral" in-plane spatial pattern is shown.

Figure 3:
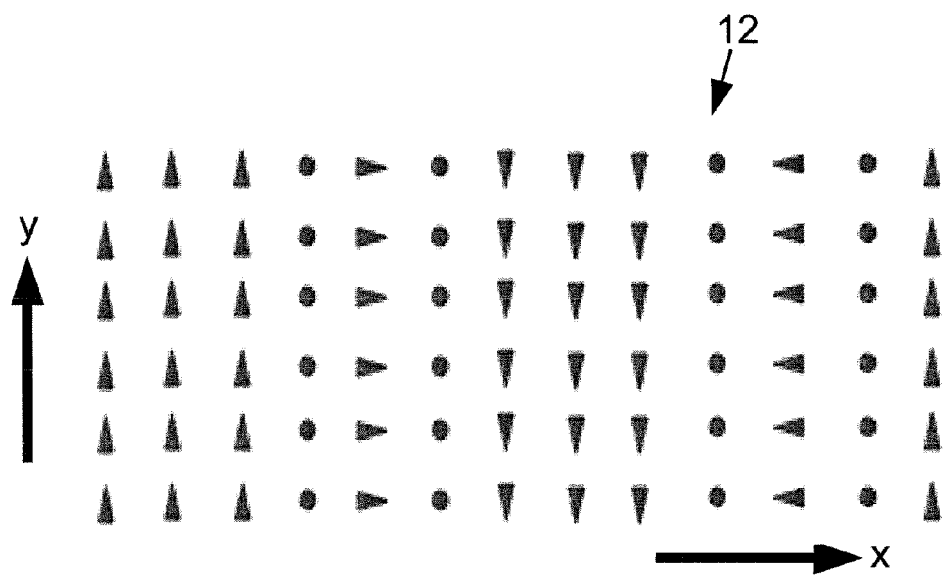

With reference to FIGS. 2 and 3, in some embodiments the structure of the liquid crystal cell is configured to provide a seed in-plane spatial pattern that causes the biased in-plane director configuration to have the desired spatial pattern. In the illustrative example of FIGS. 2 and 3, the alignment surfaces include a periodic spatial modulation along the x-direction that produces a periodic tilting precession along the x-axis of the directors of the substantially vertical director configuration. The periodic tilting precession along the x-axis is best seen in the "top view" of FIG. 3. The illustrated periodic tilting precession is discrete, following the pattern of (starting from the left-hand side of FIG. 3) a region along the x-axis of tilt in the positive y-direction, followed by a region of zero-tilt, followed by a region of tilt in the positive x-direction, followed by another region of zero-tilt, followed by a region of tilt in the negative y-direction, followed by another region of zero-tilt, followed by a region of tilt in the negative x-direction, followed by another region of zero-tilt, followed by a region of tilt in the positive y-direction thus beginning a second period of the periodic tilting precession. It is to be appreciated that the directors shown in FIGS. 2 and 3 are substantially vertically oriented, and that the tilting is small. Moreover, it is to be appreciated that the effect of the alignment layers induces a substantially vertical director configuration through the cell gap G when no voltage is applied, although their effect may be localized to a small region near the surface when voltages are applied to the electrodes.

While the illustrated spatial pattern for the seed in-plane component of the director configuration has the pattern +y/0/+x/0/−y/0/−x/0/+y/ . . . , other periodic patterns are also contemplated. For example, it is expected that a pattern of regions along the x-axis having the precession pattern +y/0/−y/0/+y/0/−y/ . . . or having the precession pattern +x/0/−x/0/+x/0/−x/ . . . may be sufficient to provide the seeding. Moreover, while in the illustrated approach a structure of the liquid crystal cell, such as rubbed or otherwise formed alignment layers, provide the seed in-plane component of the director configuration, in other embodiments a non-structural approach may be used. For example, it is contemplated that by applying a small in-plane electrical bias via the electrodes 16, it may be possible to induce a suitable seed in-plane component to the director configuration. In yet other embodiments, it is contemplated to omit the seed in-plane component of the director configuration entirely.

With reference back to FIG. 1, in the operational state a sufficient electric field strength is applied to the liquid crystal material 12 via the electrodes 16 so as to drive the director configuration of the liquid crystal material 12 into a substantially in-plane orientation. However, if a seed in-plane component was imparted to the director configuration by structure (e.g., alignment layers) or by an in-plane spatially varying seeding electrical bias, then the substantially in-plane director configuration may conform to the seed in-plane spatial pattern. Additionally or alternatively, the bias applied by the electrodes 16 to drive the liquid crystal material 12 into the in-plane director configuration can include an in-plane electrical field component that induces the desired spatially varying order to the in-plane director configuration.

Figure 4:
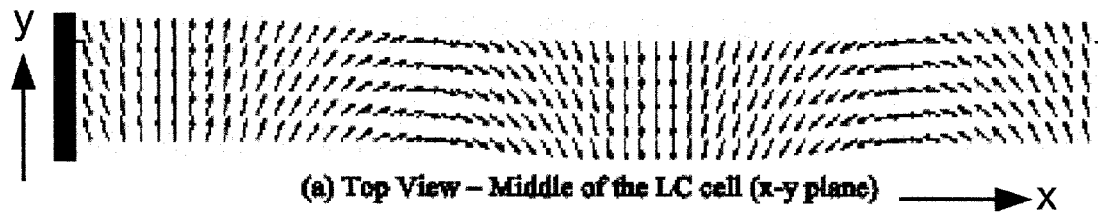
FIG. 4 shows a simulation of the device of FIGS. 1-3 under an applied bias of 20 volts.
Figure 4:
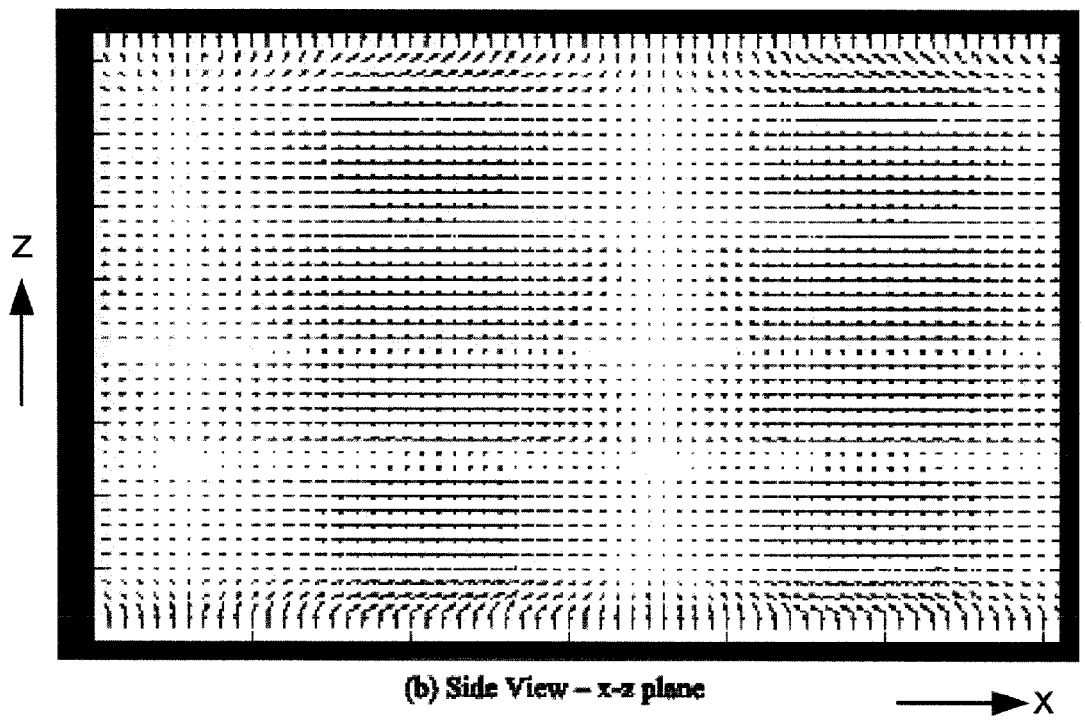

With reference to FIG. 4, for example, a simulation result is shown. In FIG. 4 the arrows diagrammatically depict the director configuration. The simulation assumed the initial tilt-precessing substantially vertical director configuration proximate to the alignment layers shown in FIGS. 2 and 3. The electrodes 16 were used to apply a wholly vertically directed 20V potential difference across the cell gap G. The result, as shown in FIG. 4, is a spiral in-plane director pattern, or more precisely a pattern that is periodic along the x-direction. In other words, the periodicity of the initial tilt-precessing substantially vertical director configuration proximate to the alignment layers shown in FIGS. 2 and 3 propagated throughout the entire cell gap G responsive to the applied 20V vertical bias, producing the substantially in-plane director configuration shown in FIG. 4 having a smooth spiral spatial pattern that has a single period of a spiral along the x-axis.

Figure 5:
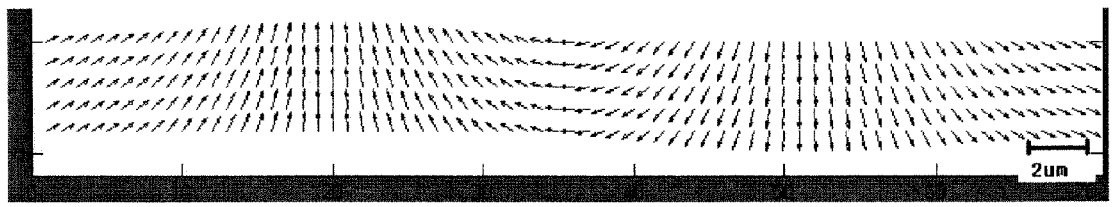
FIGS. 5-7 show simulations of different biases of the device of FIGS. 1-3 demonstrating feasibility of non-mechanical tuning of the beam bending.
Figure 5:
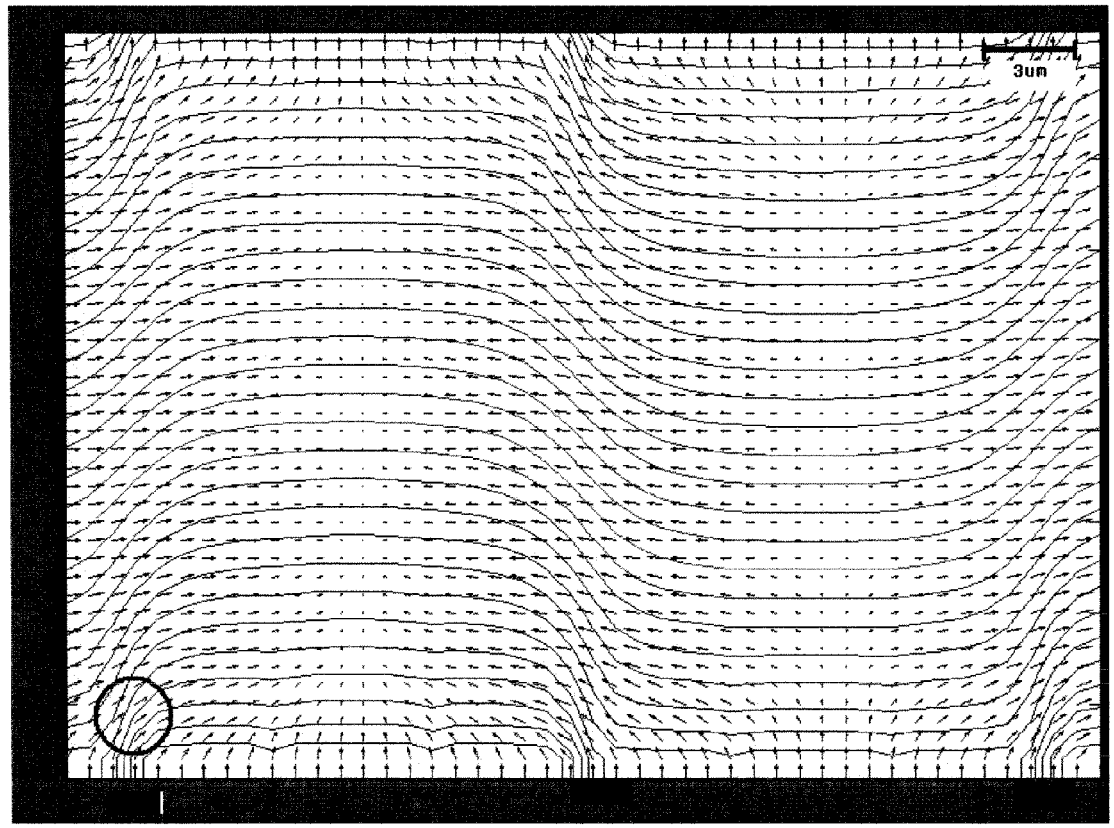
Figure 6:
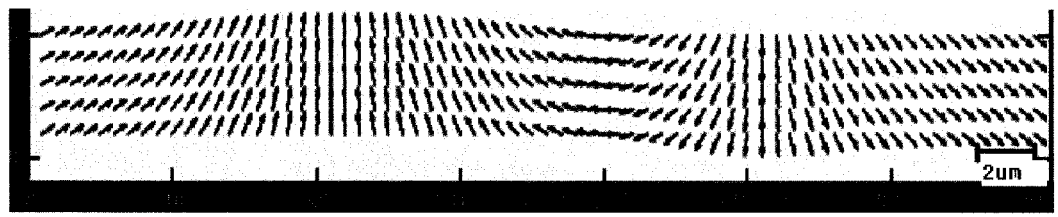
Figure 6:
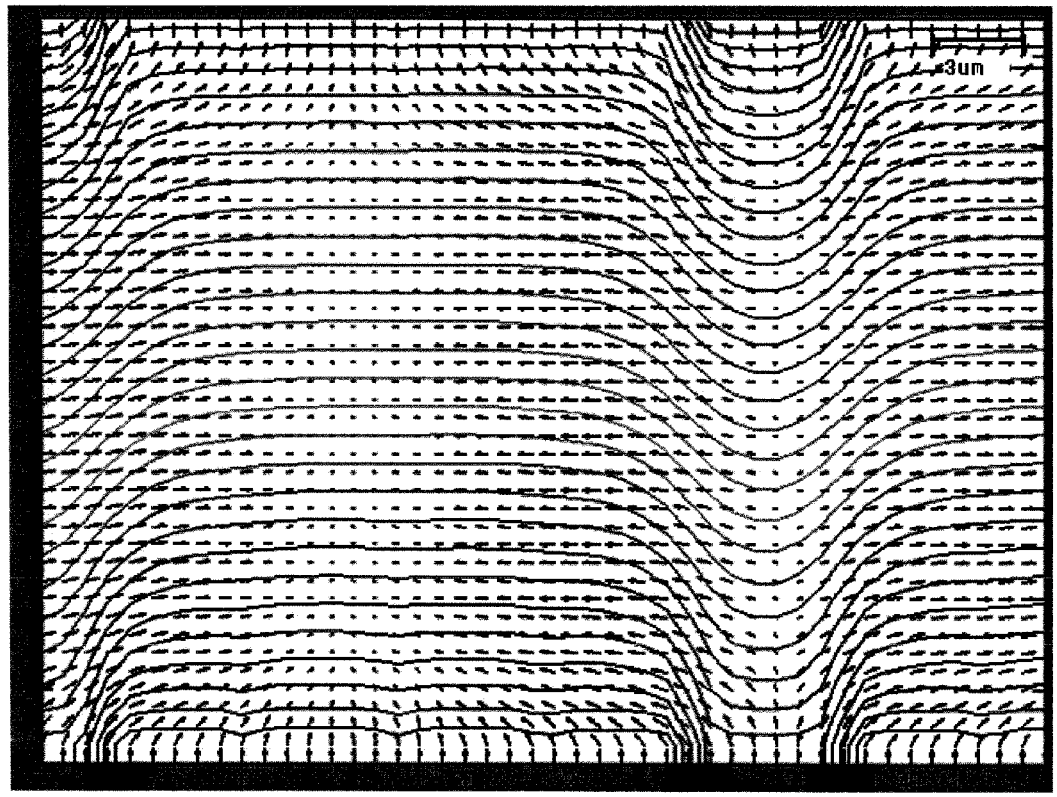
Figure 7:
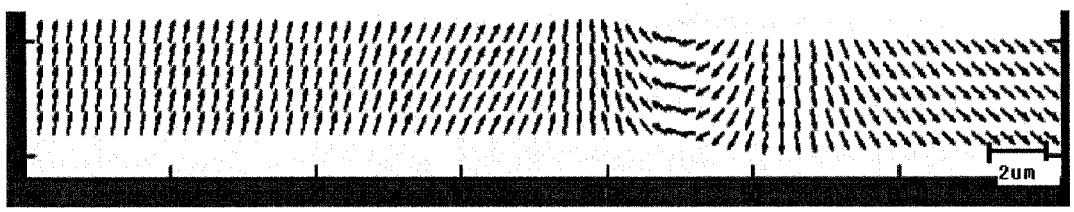
Figure 7:
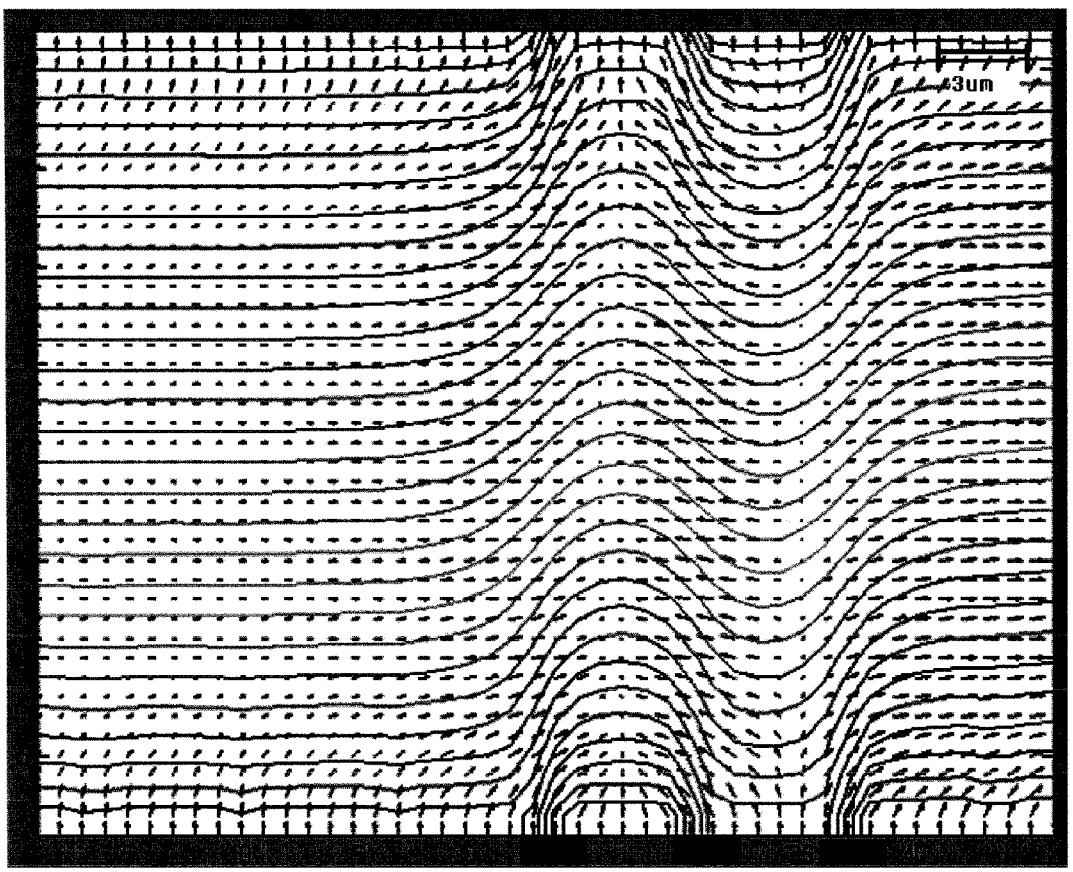

With reference to FIGS. 5-7, a simulation of tuning is provided. In these simulations, electrodes 16 on each substrate 14, 15 are arranged as pairs numbered as electrode pairs #1, #2, #3, #4, #5, #6, #7, and #8. Each of the electrode pairs can be independently biased. As in FIG. 4, the arrows in FIGS. 5-7 diagrammatically depict the director configuration; additionally, equipotential lines are plotted in the side (x-z plane) views of FIGS. 5-7. The simulation of FIG. 5 is assumed to start at the initial tilt-precessing substantially vertical director configuration proximate to the alignment layers shown in FIGS. 2 and 3. The bias applied to the electrode pairs #1, #2, #3, #4, #5, #6, #7, #8 on one substrate for the simulation of FIG. 5 was 10V/12V/12V/12V/10V/10V/10V/12V and the bias applied to the electrode pairs #1, #2, #3, #4, #5, #6, #7, #8 on the opposite substrate was 0V/2V/2V/2V/0V/0V/0V/2V. Thus, about a 10V potential difference is maintained across the gap G in the simulation across the entire aperture or length along the x-direction. However, the difference between the +12V/+2V electrode pairs and the +10V/0V electrode pairs also generates an in-plane bias component that operates in conjunction with the seed in-plane director configuration pattern of FIGS. 2 and 3 to promote ordering in the in-plane director configuration in the biased operational state. The result, as shown in FIG. 5, is a spiral in-plane director pattern, or more precisely a pattern that is periodic along the x-direction with a period of about 15.5 microns.

FIG. 6 shows a continuation of the simulation of FIG. 5, in which the applied bias is changed to 10V/12V/12V/12V/12V/10V/12V/12V and 0V/2V/2V/2V/2V/0V/2V/2V. The effect is to reduce the period to 13.5 microns. It is further anticipated that when the value of the electrode width ($W_e$) and the gap between electrodes ($W_g$), that is, $W_e+W_g$, is less than the cell gap (G), changing the spiral length by less than an electrode width $W_e$ is possible by using intermediate voltages. For example if the voltage the 5th electrode pair on the two substrates was 11 and 1 volts, so that voltage applied to the substrates is: 10/12/12/12/11/10/10/12 and 0/2/2/2/1//0/0/2, the period of the spiral would be expected to be approximately 14.5 microns. FIG. 7 shows a further continuation in which the applied bias is further changed in three additional steps to a final setting of 10V/10V/10V/10V/12V/10V/12V/12V and 0V/0V/0V/0V/2V/0V/2V/2V, yielding a period of 7 microns. These simulations show the tuning of the electro-optical device over almost a factor of two change in the period.

The general effect of a periodic in-plane variation in the director configuration is to impart a specific gradient in the phase of the output light. Equation (4) was developed in conjunction with a non-tunable beam bending device, but is also applicable to tunable period devices as disclosed herein if the cell gap G in combination with the optical properties of the liquid crystal material 12 are selected to define a half-wave phase retardation across the cell gap G for a selected operating wavelength of light. In Equation (4), the angle β corresponds to the in-plane director orientation, which as seen for example in FIGS. 4-7 can be varied along the x-axis during operation of the illustrated electro-optical devices. The phase factor $e^{i \cdot 2\beta}$ for the light therefore varies at twice the rate of the angle β. As shown in FIG. 1, the result is that the output light $E_{out}$ is bent at an angle respective to the input light $E_{in}$, and that angle is dependent upon the tunable period of the in-plane director configuration spatial pattern, thus providing a non-mechanically tunable beam steering device. The simulations of FIGS. 4-7 show effective tuning over a single period, but this readily demonstrates feasibility for multiple periods, as described next.

Figure 8:
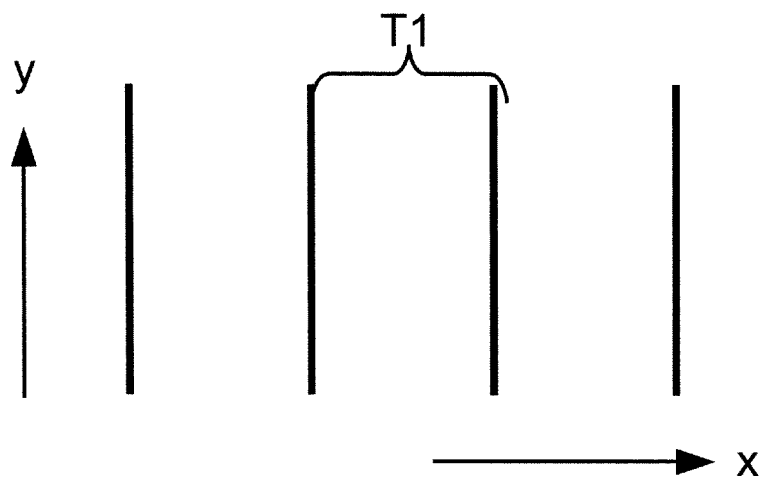
FIG. 8 shows two tuned configurations of periodicities T1 and T2, respectively.
Figure 8:
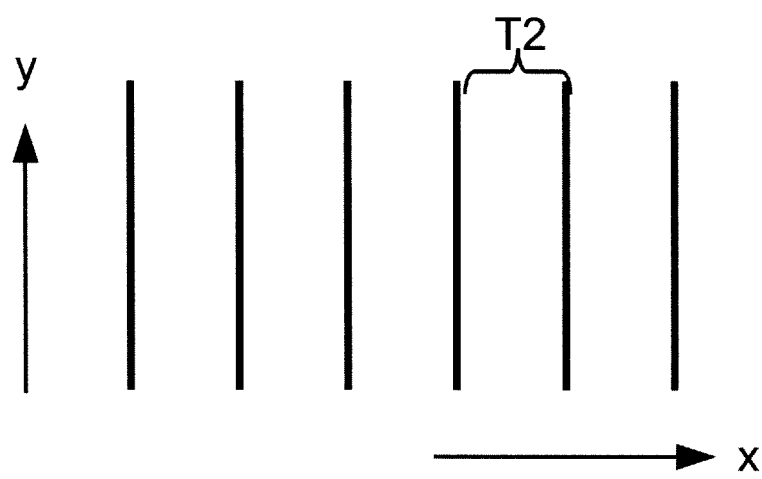
Figure 9:
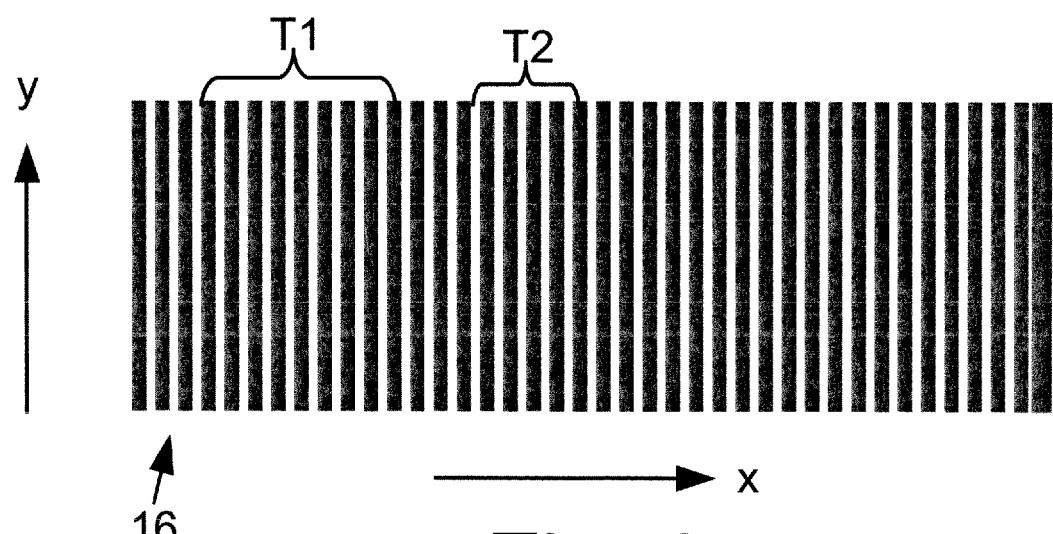
FIG. 9 shows a set of electrode elements suitable for tuning to the tuned configurations of FIG. 8.

With reference to FIGS. 8 and 9, by repeating the spatial cycling of the electrode biases over multiple successive periods along the x-axis, the approach of FIGS. 4-7 is readily extended to provide variation of the liquid crystal director configuration period over multiple periods, i.e. over several periods, several dozen periods, several hundred periods, or more periods. FIG. 8 diagrammatically shows two such tuning configurations. In these diagrammatic representations, each line at a particular position along the x-axis represents a region of the generally in-plane director configuration having a common value of β, so the spacing of the lines represents the periodicity of the generally in-plane director configuration. The top tuning configuration has a period T1 and the bottom tuning configuration has a shorter period T2. The periods T1 and T2 are periods of the in-plane director configuration spatial pattern along the x-axis. The corresponding phase gradient along the x-axis of the device is larger in the case of the shorter period, in view of the $e^{i \cdot 2\beta}$ optical phase factor.

FIG. 9 shows a suitable corresponding pattern for the electrodes 16, assuming pairing of electrode elements on the opposing substrates 14, 15. The same pattern of electrodes shown in FIG. 9 can be used to generate either the tuned configuration having period T1, or the tuned configuration having the period T2. To achieve the different tunings, the periodicity of the applied electrical bias may be changed. For example, as seen in FIG. 9 a bias repetition every nine electrode elements is suitable for generating the tuning configuration of period T1, whereas a bias repetition every four or five electrode elements is suitable for generating the tuning configuration of period T2. Spatial in-plane director configuration periods that do not coincide with a multiple of the spacing of the electrode elements can be achieved by using suitable interpolation biases to generate the appropriate in-plane electrical field pattern.

While in FIGS. 4-7 the seed in-plane director configuration pattern is provided by structural biasing, such as by alignment layers, the source of the seed in-plane director configuration pattern can also be an in-plane electrical bias variation or other source. Still further, it is contemplated to rely entirely upon in-plane electrical bias variation in the operational mode, i.e. in conjunction with a vertical electrical field of sufficient strength to orient the director configuration substantially in-plane, without any reliance upon a seed in-plane director configuration pattern.

As another option, it is contemplated to employ a two-frequency liquid crystal material exhibiting positive dielectric anisotropy in a first frequency range and negative dielectric anisotropy in a second frequency range different from the first frequency range. In this case the applied operational electrical potential biasing the director configuration of the liquid crystal material toward the generally in-plane orientation is in the second frequency range. In such an embodiment, a bias in the first frequency range is optionally used to establish a substantially vertical director configuration in the non-operational state, and can be substituted for the structural bias in FIGS. 2 and 3. The bias in the first frequency range can be applied using the same electrodes 16 used to apply the operational bias, or different electrodes can be provided.

In one example embodiment employing a "two frequency" liquid crystal material, the applied AC voltage would have a frequency difference between electrodes on the two surfaces 14, 15 of the cell that would have a high frequency component that would tend to make the director lie perpendicular to the z direction. And at the same time the voltage applied between selected electrodes on the same surface would have a frequency difference that has a low frequency component that would cause the director to tend to align along the x direction.

Figure 10:
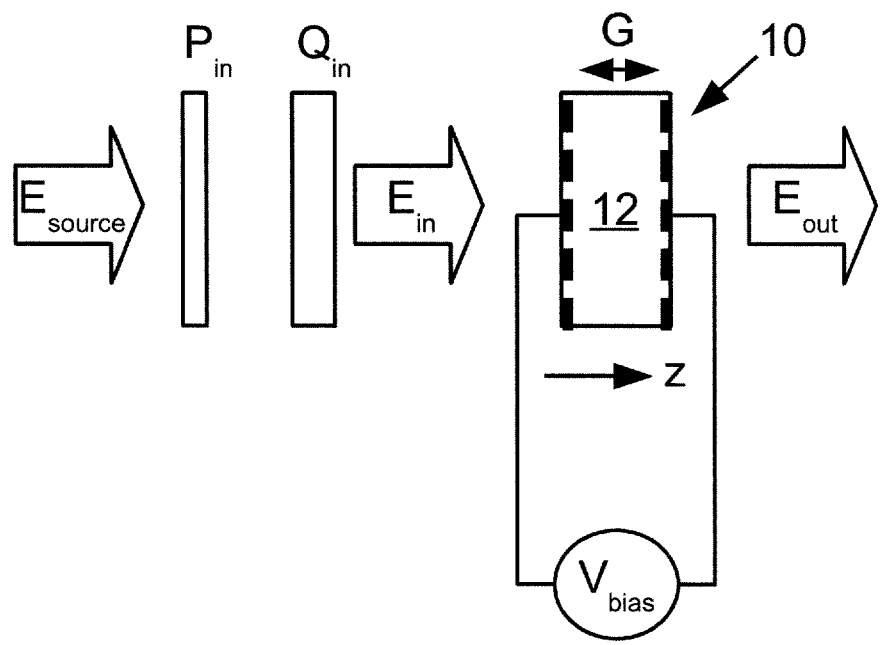
FIG. 10 diagrammatically shows a beam steering apparatus.

With reference to FIG. 10, an illustrative beam steering apparatus is shown based on the electro-optical device 10 previously described. In the beam steering apparatus of FIG. 10, a source light $E_{source}$ which does not have any particular polarization is input to a polarizer $P_{in}$ to impart a linear polarization and to a quarter-wave plate $Q_{in}$ to convert the linearly polarized light to input light $E_{in}$ having a circular polarization. This circularly polarized light is input to the electro-optical device 10, having a cell gap G providing a half-waveplate phase retardation, which imposes a periodic phase variation on the light of the form $e^{i \cdot 2\beta}$ in accordance with Equation (4) and the periodic variation in the in-phase director configuration. The periodic variation is controlled by a voltage source $V_{bias}$ which, while represented in FIG. 10 by a single icon for simplicity, is generally a more complex electrical device that biases the individual electrode elements of the electrodes 16 in a selectable or tunable manner so as to impart the periodicity onto the in-phase director configuration appropriate to provide the desired angle of beam steering. The output light $E_{out}$ is steered in the selected direction. Although not shown in FIG. 10, if linearly polarized light of a known orientation is desired, one can process the output light $E_{out}$ by an output quarter-waveplate matched to the input quarter-waveplate $Q_{in}$ in a QHQ configuration to convert the output light $E_{out}$ to linearly polarized light.

The level of beam steering provided is determined by the complexity of the voltage source $V_{bias}$. In some embodiments, this voltage source may be a programmable voltage source having several independently controllable outputs, and a microprocessor, microcontroller, or the like programmed to apply a specific set of voltages to the electrode elements to obtain the desired beam steering angle. The specific set of voltages are suitably calculated by modeling, or determined empirically, and can be stored in a lookup table for rapid retrieval.

In the previous embodiments, the electrodes 16 have elements along the x-direction, but not along the y-direction. This is suitable to enable imparting periodicity along the x-direction. If the periodicity is varied across the aperture of the liquid crystal cell, it is possible to achieve other optical effects such as a variable focus for an electro-optical device operating as a cylindrical lens.

Figure 11:
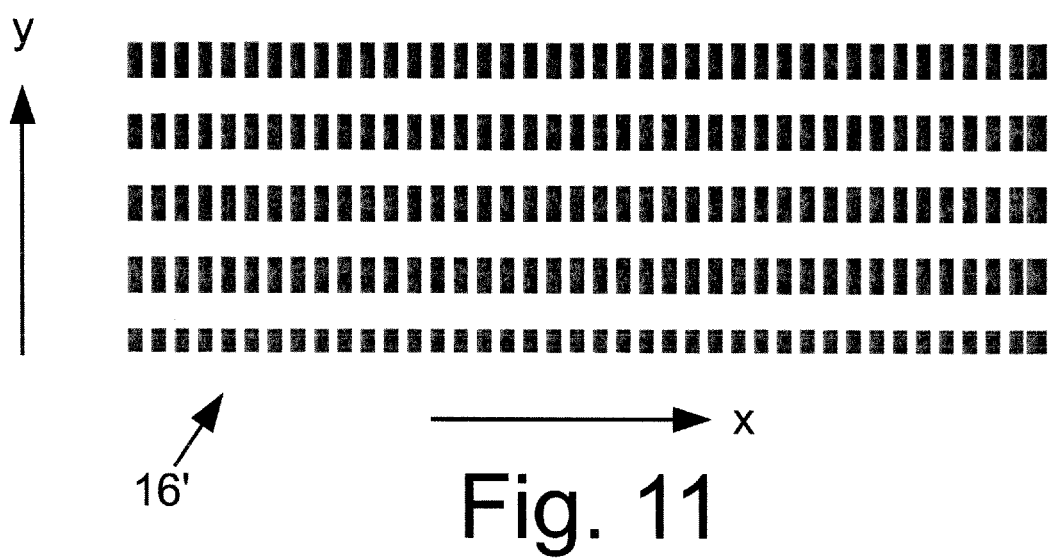
FIG. 11 shows an alternative two-dimensional array of electrode elements.

With reference to FIG. 11, still further control can be achieved by using a two-dimensional array of electrode elements 16'. This arrangement can be used, for example, to provide a variable periodicity in both x- and y-directions, so as to achieve a variable focus lens. In other embodiments, the in-plane bias components in orthogonal directions achievable using the electrode elements 16' are contemplated to be used to provide asymmetry for acquiring the desired spiral pattern without use of a patterned alignment layer or other seed in-plane director configuration pattern.

With reference back to FIGS. 2 and 3, it was previously noted that alternative periodic seed patterns can be used. In one alternative approach, the periodic pattern has only two regions, e.g. +x/0/−x/0/+x/0/−x/ . . . or +y/0/−y/0/+y/0/− y/ . . . . This pattern is optionally used in cooperation with an in-plane seed electric field component that can be formed by the electrodes 16 or by dedicated seed bias electrodes.

Figure 12:
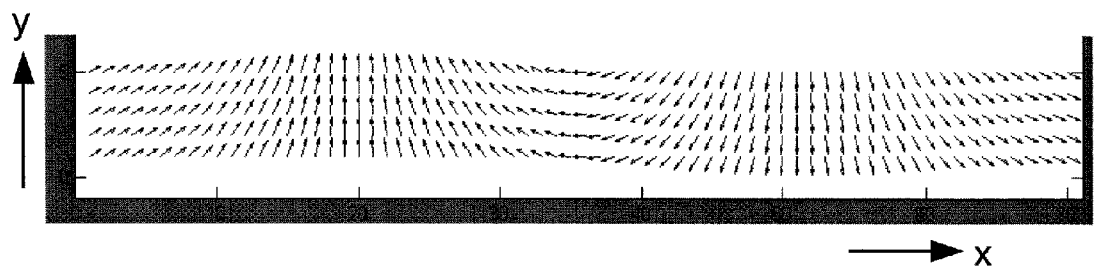
FIG. 12 shows a simulation of the device of FIG. 1 with a different seed in-plane director configuration pattern.
Figure 12:
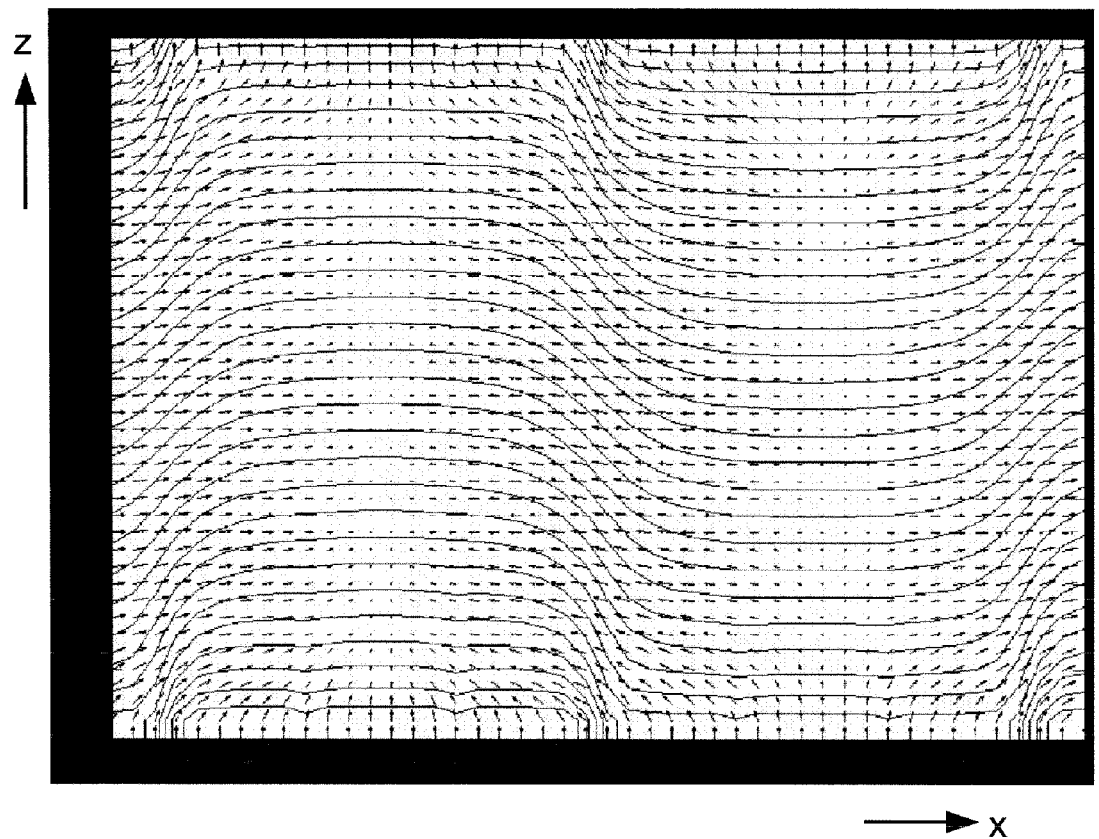

With reference to FIG. 12, consider that the electrode or electrodes between the x axis points of 4 and 23 have a + voltage offset, and a − offset if x is between 24 and 43. This is as shown in FIG. 12. Further consider that about the center ¼ to ½ of each of these areas has a tilted vertical axis alignment so that the region containing grid points 11-17 is tilted away from vertical so the top of the arrows are tipped into the plane of the FIGURE, and where the region containing about grid points 31-37 are tipped out of the plane of the FIGURE. Then as the voltage is ramped up the spiral pattern as shown in FIG. 12 will be formed. However, if the voltage offset regions change sign the sense of the spiral can be reversed. In this case the electrode or electrodes between x values of 4 and 23 have a negative voltage offset and those between 24 and 43 have a positive offset. In this case the twist sense of the spiral will be reversed from what is shown in FIG. 12.

This type of reversal effect can optionally be used to provide a beam steering device that can rapidly switch between steering light to three different angles: +θ, −θ, and zero, with the magnitude of θ being determined by the period of the spiral controlled by the periodicity of the seed in-plane director configuration pattern and the applied operational bias.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A tunable liquid crystal device comprising:
   a cell including parallel spaced apart substrates defining a cell gap and an aperture;
   a liquid crystal material disposed in the cell gap, a director configuration of the liquid crystal material at least near the substrates having a generally vertical orientation further including a spatially varying in-plane component conforming to an in-plane spatial pattern; and
   a biasing arrangement including;
      electrodes disposed on or in the parallel spaced apart substrates, the electrodes on or in both substrates being segmented to form opposing electrode segment pairs across the cell gap with the electrode segment pairs distributed across the aperture of the cell, and
      a voltage source connected with the electrodes and configured to simultaneously apply the same potential difference across all the electrode segment pairs and a spatially varying in-plane potential across the electrode segments of the electrode on or in each substrate to generate an operational electrical potential across the cell gap having an in-plane electric field component with adjustable spatial variation across the aperture of the cell and a vertical electric field component that is constant across the aperture of the cell, the vertical electric field component of the operational electrical potential biasing the director configuration of the liquid crystal material into an in-plane orientation generally conforming to the in-plane spatial pattern with at least one dimension adjustable by adjustment of the in-plane electric field component of the operational electrical potential wherein the at least one adjustable dimension includes a period of the in-plane spatial pattern;
   wherein the cell gap and the liquid crystal material define a half-wave phase retardation across the cell gap for a selected wavelength of light that is steered.

2. The tunable liquid crystal device as set forth in claim 1, wherein the spaced apart substrates include electrodes applying an in-plane electrical bias biasing the director configuration of the liquid crystal material at least near the substrates to have the spatially varying in-plane component conforming to the in-plane spatial pattern.

3. The tunable liquid crystal device as set forth in claim 1, wherein the liquid crystal material has a negative dielectric anisotropy.

4. The tunable liquid crystal device as set forth in claim 1, wherein the liquid crystal material is a two-frequency liquid crystal material exhibiting a positive dielectric anisotropy in a first frequency range and a negative dielectric anisotropy in a second frequency range different from the first frequency range, and the applied electrical potential biasing the director configuration of the liquid crystal material into the in-plane orientation is in the second frequency range.

5. The tunable liquid crystal device as set forth in claim 4, wherein the electrodes are further configured to apply a seed in-plane electrical potential in the first frequency range biasing the director configuration of the liquid crystal material at least near the substrates to have the in-plane spatial pattern.

6. The tunable liquid crystal device as set forth in claim 1, wherein the tunable liquid crystal device defines an optical switch.

7. The tunable liquid crystal device as set forth in claim 1, wherein the in-plane spatial pattern is generally spiral.

8. The tunable liquid crystal device as set forth in claim 7, wherein the in-plane spatial pattern that is generally spiral comprises an in-plane smooth spiral pattern that is periodic along an in-plane direction.

9. The tunable liquid crystal device of claim 1, wherein the spaced apart substrates include alignment layers proximate to the cell gap biasing the director configuration of the liquid crystal material at least near the substrates to have the spatially varying in-plane component conforming to the in-plane spatial pattern.

10. A tunable liquid crystal device comprising:
    a cell including parallel spaced apart substrates defining a cell gap and an aperture;
    a liquid crystal material disposed in the cell gap, a director configuration of the liquid crystal material at least near the substrates having a generally vertical orientation further including a spatially varying in-plane component of the director configuration conforming to an in-plane spatial pattern; and
    a biasing arrangement including;
       a segmented electrode disposed on or in each of the parallel spaced apart substrates, and
       a voltage source connected with the segmented electrodes and configured to apply an operational electrical potential to the cell that simultaneously includes a spatially varying in-plane electric field component that spatially varies across the electrode segments of each segmented electrode and a vertical electric field component that is substantially constant across the aperture of the cell, the vertical electric field component of the applied operational electrical potential biasing the director configuration of the liquid crystal material into an in-plane orientation generally conforming to the in-plane spatial pattern with at least one dimension adjustable by adjustment of the spatially varying in-plane electric field component across the electrode segments of each segmented electrode;

wherein the cell gap and the liquid crystal material define a half-waveplate phase retardation across the cell gap for a selected wavelength of light that is steered.

11. The tunable liquid crystal device as set forth in claim 10, wherein the in-plane spatial pattern has a period along at least one dimension that is adjustable by adjustment of the applied electrical potential.

12. The tunable liquid crystal device as set forth in claim 10, wherein the at least one dimension adjustable by adjustment of the applied electrical potential includes an in-plane periodicity defining a beam steering angle of a beam steering device.

13. The tunable liquid crystal device as set forth in claim 10, wherein the at least one dimension adjustable by adjustment of the applied electrical potential includes a spatially varying in-plane periodicity defining a lensing characteristic of a lens.

14. The tunable liquid crystal device of claim 11, wherein the spaced apart substrates include alignment layers proximate to the cell gap biasing the director configuration of the liquid crystal material at least near the substrates to have the spatially varying in-plane component conforming to the in-plane spatial pattern.

15. A beam steering method comprising:
providing a liquid crystal material disposed in a cell including parallel spaced apart substrates defining a cell gap and an aperture, the liquid crystal material having a generally vertical director orientation in the absence of biasing; and
biasing the liquid crystal material to generate a vertical electric field component that is constant across the aperture of the cell to obtain an in-plane director orientation with the in-plane director orientation varying smoothly along an in-plane direction across the aperture of the cell; and
adjusting a periodicity of the smooth variation of the in-plane director orientation across the aperture of the cell by adjusting the biasing to generate spatial variation of an in-plane electric field component of the biasing to effectuate a desired beam steering angle while maintaining the vertical electric field component constant across the aperture of the cell during the adjusting.

16. The beam steering method of claim 15, further comprising:
providing one or more alignment layers on surfaces of the cell proximate to the liquid crystal material that seed the director configuration in the absence of the biasing with an in-plane director configuration component having a seed spatial periodicity.

17. The beam steering method of claim 15, further comprising:
providing seed in-plane electrical bias that seeds the director configuration in the absence of the biasing with an in-plane director configuration component having a seed spatial periodicity.

18. The beam steering method of claim 15, wherein the director configuration in the absence of the biasing has no seed spatial periodicity.

19. The beam steering method of claim 15, wherein the liquid crystal material has a negative dielectric anisotropy.

20. The beam steering method of claim 15, wherein the liquid crystal material is a two-frequency liquid crystal material exhibiting a positive dielectric anisotropy in a first frequency range and a negative dielectric anisotropy in a second frequency range different from the first frequency range, and the biasing is in the second frequency range.

21. The beam steering method of claim 20, wherein the providing comprises:
providing an in-plane seed bias in the first frequency range inducing a generally vertical director configuration having an in-plane component with a seed spatial periodicity.

22. The beam steering method as set forth in claim 15, wherein the liquid crystal material and a cell gap of the cell are selected to define a half-wave phase retardation across the cell gap for a selected wavelength of light to be steered.

23. The beam steering method as set forth in claim 15, wherein during the biasing the liquid crystal material retains the generally vertical director orientation adjacent the substrates of the cell.

* * * * *